United States Patent
Sugino (10) Patent No.: US 10,439,376 B2
(45) Date of Patent: Oct. 8, 2019

(54) WIRE HARNESS

(71) Applicant: Sumitomo Wiring Systems, Ltd., Yokkaichi, Mie (JP)

(72) Inventor: Hidetoshi Sugino, Mie (JP)

(73) Assignee: SUMITOMO WIRING SYSTEMS, LTD., Yokkaichi, Mie (JP)

( * ) Notice: Subject to any disclaimer, the term of this patent is extended or adjusted under 35 U.S.C. 154(b) by 150 days.

(21) Appl. No.: 15/822,480

(22) Filed: Nov. 27, 2017

(65) Prior Publication Data
US 2018/0175596 A1  Jun. 21, 2018

(30) Foreign Application Priority Data
Dec. 19, 2016 (JP) .................. 2016-245019

(51) Int. Cl.
*H02G 3/04* (2006.01)
*B60R 16/02* (2006.01)
*H01B 7/00* (2006.01)
*H02G 3/32* (2006.01)

(52) U.S. Cl.
CPC ....... *H02G 3/0481* (2013.01); *B60R 16/0215* (2013.01); *H01B 7/0045* (2013.01); *H02G 3/32* (2013.01)

(58) Field of Classification Search
CPC ...... H02G 3/0481; H02G 3/32; H01B 7/0045; B60R 16/0215
See application file for complete search history.

(56) References Cited

U.S. PATENT DOCUMENTS

2004/0099427 A1   5/2004  Kihira

FOREIGN PATENT DOCUMENTS

JP          2004171952 A      6/2004

*Primary Examiner* — Robert L Deberadinis
(74) *Attorney, Agent, or Firm* — Reising Ethington, P.C.

(57) ABSTRACT

A wire harness capable of combining low voltage wires and high-voltage wires without using shielded wires. The harness is provided with high-voltage wires, which are passed through a pipe possessing shielding properties and shape retention properties, and a low voltage wire, in which a shape-retaining conductor that runs parallel to the pipe and possesses electrically conductive properties and shape retention properties is encased by an insulating member. The low voltage wire is placed on the outside of the pipe and, as a result, the low voltage wire is not affected by the electromagnetic noise of the high voltage wires, which makes it possible to combine the high-voltage wires and the low voltage wire.

3 Claims, 7 Drawing Sheets

WIRE HARNESS

CROSS REFERENCE TO RELATED APPLICATIONS

This application claims the priority of Japanese patent application JP2016-245019 filed on Dec. 19, 2016, the entire contents of which are incorporated herein.

TECHNICAL FIELD

The present invention relates to a wire harness.

BACKGROUND ART

High voltage wire harnesses used to connect high voltage batteries and inverters, etc., in hybrid vehicles and the like, have been known in the past. Most of such wire harnesses are routed under the floor of the vehicle. For example, a technology is known, in which, as described in JP 2004-171952A, protection from flying stones, etc., is afforded by passing high voltage wires through a metal pipe. In addition, passing high voltage wires through a metal pipe makes it possible to block electromagnetic noise generated by the high voltage wires and, in addition, maintain the shape of the wire harness using a pipe bent to match the routing pathway of the vehicle.

Incidentally, when a low voltage wire is routed under the floor of the vehicle, the low voltage wire is sometimes passed through the above-described pipe together with a high voltage wire. In such cases, shielded wires need to be used in order to prevent the low voltage wire from being affected by the electromagnetic noise of the high voltage wire.

JP 2004-171952A is an example of related art.

SUMMARY

However, shielded wires are expensive and are also heavier and have larger diameter dimensions than ordinary wires without shielding capabilities. This creates problems in terms of increasing the cost and weight of the low voltage wire on the whole, as well as causes an increase in the diameter of the pipe.

The present design was made by taking the above-described circumstances into consideration and it is an object of invention to provide a wire harness capable of combining low voltage wires and high voltage wires without using shielded wires.

The wire harness of the present design includes a high voltage wire that is passed through a pipe having shielding properties and shape retention properties, and a low voltage wire in which a shape-retaining conductor that runs parallel to the pipe and has electrically conductive properties and shape retention properties is encased by an insulating member.

According to the present design, a high voltage wire and a low voltage wire can be combined without using a shielded wire due to the fact that the low voltage wire is not affected by the electromagnetic noise of the high voltage wire because the low voltage wire is placed on the outside of the pipe.

EMBODIMENTS

A preferred embodiment is illustrated below.

In the wire harness of the present design, when the harness is secured to the body of a vehicle, the portion placed under the floor of the vehicle may be such that the lower end of the pipe is located in a position that is relatively lower than the lower end of the low voltage wire. If such a configuration is used, the low voltage wire can be protected because the pipe hits the ground first, thereby making it possible to prevent the low voltage wire from hitting the ground.

In addition, the wire harness of the present design may have a clamp that retains the pipe and the low voltage wire in place while being secured to a vehicle body, with the clamp being provided with an engagement pawl that can be engaged with a fixed portion protruding from the vehicle body. If such a configuration is used, placing the engagement pawl in engagement with the fixed portion secures the clamp to the vehicle body, as a result of which the clamp can be secured to the vehicle body without using fastening members such as, for example, bolts and nuts.

Embodiment

Below, a specific embodiment will be described in detail with reference to FIGS. 1-8. The wire harness W used in the present embodiment is installed in an electric automobile or a hybrid car. This wire harness W is provided with high voltage wires 10 forming part of a high voltage circuit and a low voltage wire 20 forming part of a low voltage circuit. The high voltage wires 10 connect equipment (an engine, an inverter, etc.) M1 installed in the front portion of the vehicle to equipment (a high voltage battery) M2 installed in the rear portion of the vehicle, and the low voltage wire 20 connects equipment (a fuse box, etc.) M3 installed in the front portion of the vehicle to equipment (for example, a 12V battery or another low voltage battery) M4 installed in the rear portion of the vehicle. Most of the wire harness W is routed under the floor of the vehicle (see FIG. 3).

Figure 4:
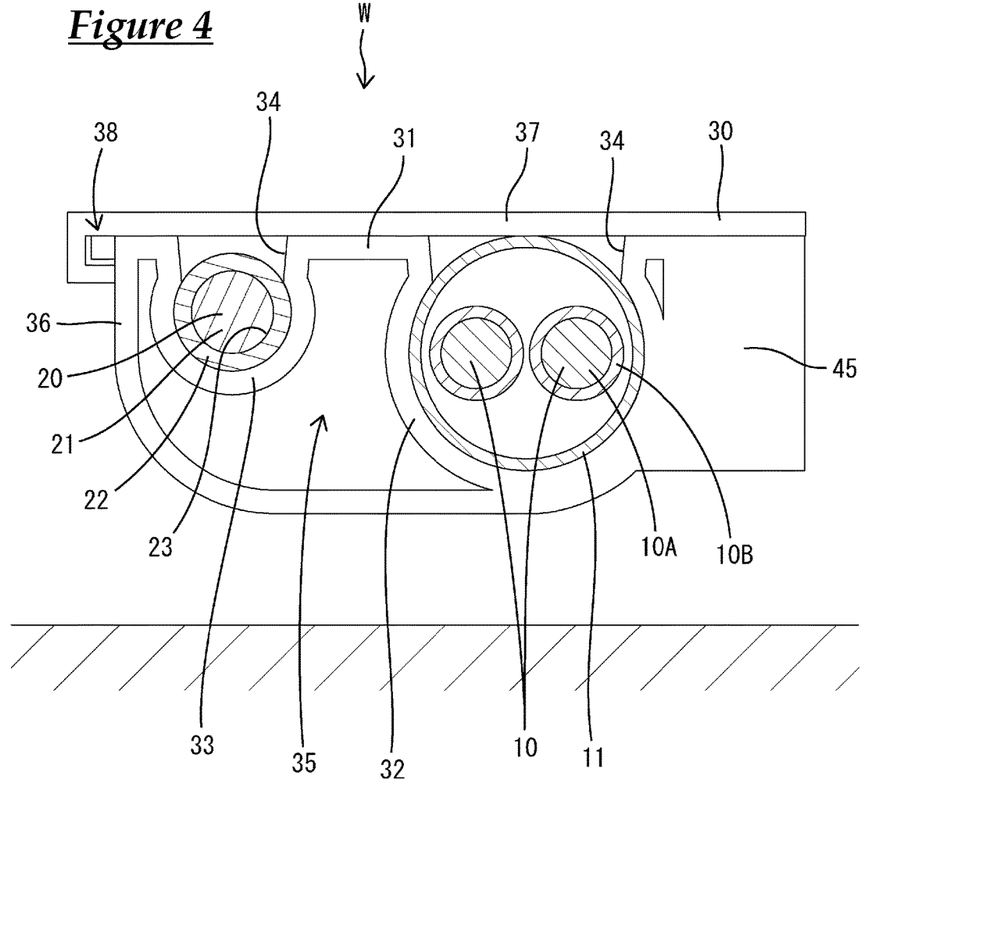
FIG. 4 is a cross-sectional view illustrating the positional relationship of the wire harness relative to the ground surface when the wire harness is secured to a vehicle body, where the cross-sectional view corresponds to a cross-section taken along A-A in FIG. 3.

As shown in FIG. 4, the high voltage wires 10 are ordinary wires without shielding capabilities obtained by encasing a flexible conductor (for example, a stranded conductor produced by twisting multiple metal filaments) 10A in an insulation jacket 10B. The high voltage wires 10 can handle high voltages and high currents. Terminal fittings (not shown) are connected to the end portions of the high voltage wires 10. The terminal fittings are received within connectors C that can be connected to equipment.

The high voltage wires 10 are passed through a pipe 11 that possesses shielding properties and shape retention properties. The pipe 11 is an elongated tube made of metal (e.g., copper or copper alloy, aluminum or aluminum alloy). The pipe 11 has a full circle shape in cross-section, with multiple (two in the present embodiment) high voltage wires 10 passing therethrough. The diameter dimensions of the pipe 11 are smaller in comparison with the dimensions conventionally used when passing both high voltage wires and low voltage wires (shielded wires) therethrough. The pipe 11 is bent into a predetermined shape using a bending machine.

Figure 1:
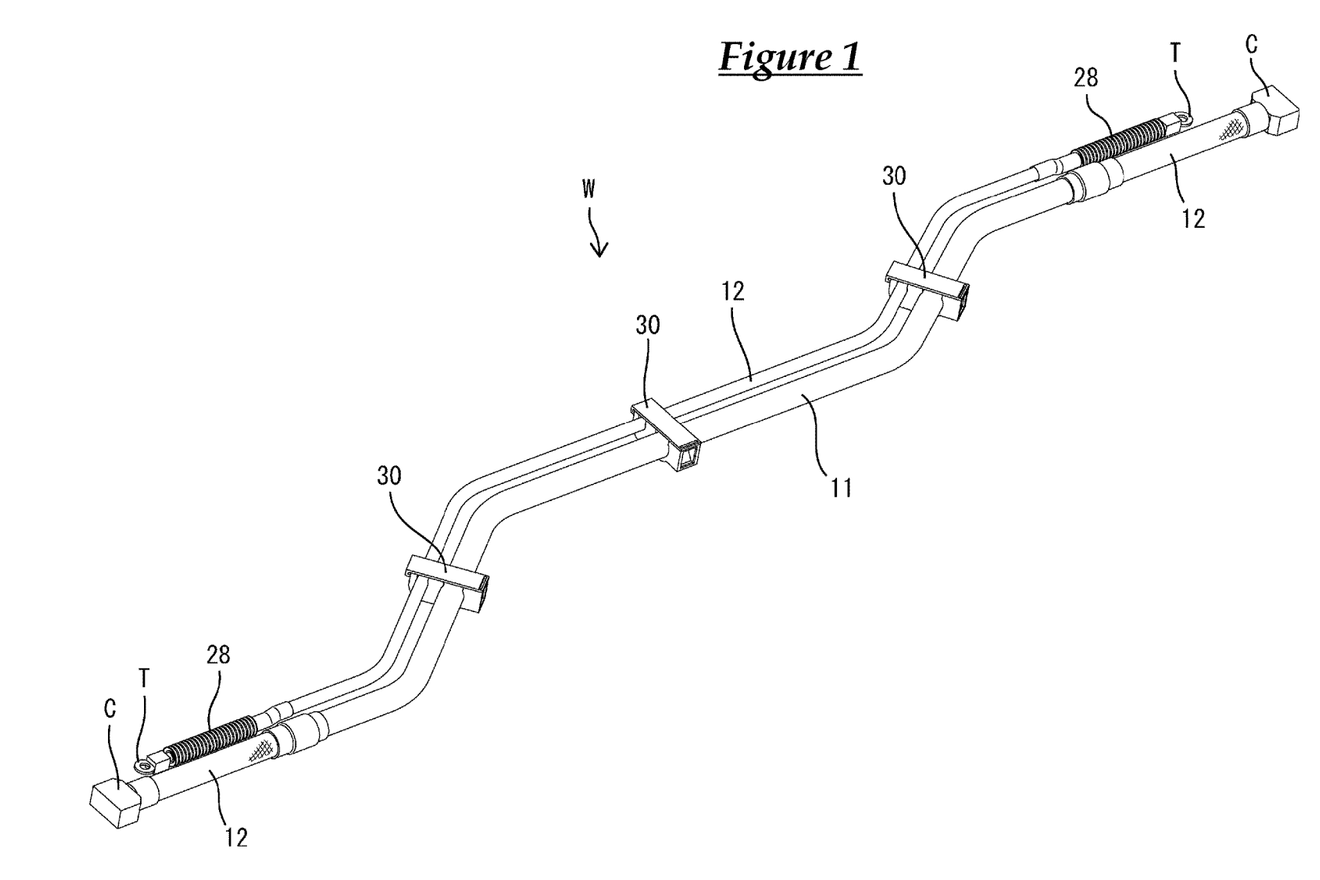
FIG. 1 is a perspective view illustrating the wire harness used in the present embodiment.

Shielding members 12, which possess shielding properties and flexibility, are conductively connected to the end portions of the pipe 11. The shielding members 12 are made of braided members produced by braiding fine metal filaments in the shape of a tube, or metal tape and the like. One end of the shielding members 12 is securely attached to the pipe 11, while the other end is connected to a connector C. The entire length of the high voltage wires 10 is covered by the pipe 11 and shielding members 12, thereby blocking the electromagnetic noise generated by the high voltage wires 10.

The low voltage wire 20 is a wire, in which a shape-retaining conductor 21 possessing electrically conductive properties and shape retention properties is encased by an insulating member 22. The shape-retaining conductor 21 is a pipe or a solid rod-shaped member (single core conductor) made of metal (e.g., copper or copper alloy, aluminum or aluminum alloy). The shape-retaining conductor 21 is an elongated member with a circular cross-section whose length dimensions are equivalent to those of the pipe 11. The outside diameter dimensions of the shape-retaining conductor 21 are made smaller than the outside diameter dimensions of the pipe 11.

The insulating member 22 insulates and protects the shape-retaining conductor 21. The insulating member 22 is shaped as an elongated cylinder having a hollow portion 23, through which the shape-retaining conductor 21 passes, and has length dimensions that are equivalent to those of the shape-retaining conductor 21. The insulating member 22 is an insulating tube or shrink tube formed, for example, by extrusion molding. The insulating member 22, which is made of synthetic resin (e.g., polypropylene or polyamide, etc.), has larger thickness dimensions than an ordinary wire covering. The diameter dimensions of the hollow portion 23 of the insulating member 22 are equivalent to the outside diameter dimensions of the shape-retaining conductor 21, such that the insulating member 22 intimately adheres to the shape-retaining conductor 21.

The low voltage wire 20 is placed on the outside of the pipe 11 and is bent to match the pipe 11. The low voltage wire 20 runs substantially parallel to the pipe 11 with a predetermined gap provided between it and the pipe 11.

Figure 2:
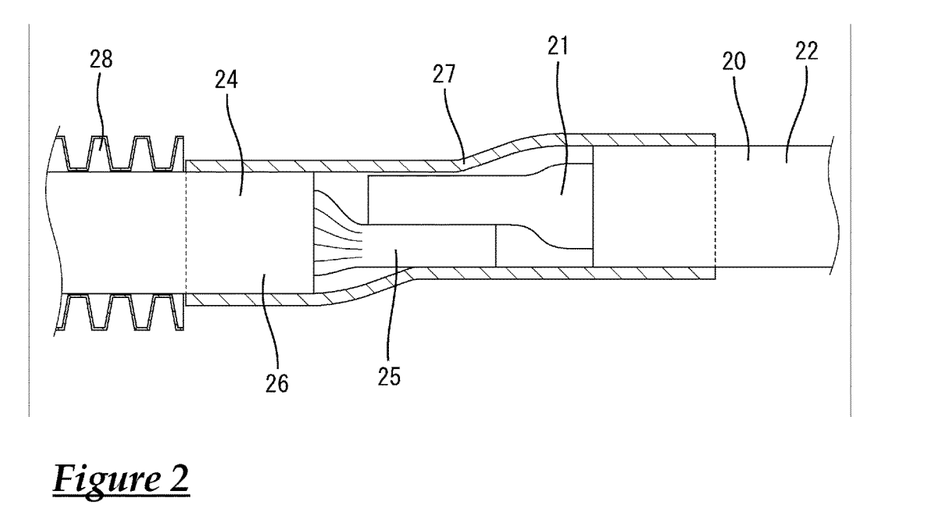
FIG. 2 is a close-up cross-sectional view of a connecting portion, in which a low voltage wire and a flexible wire are joined.
Figure 3:
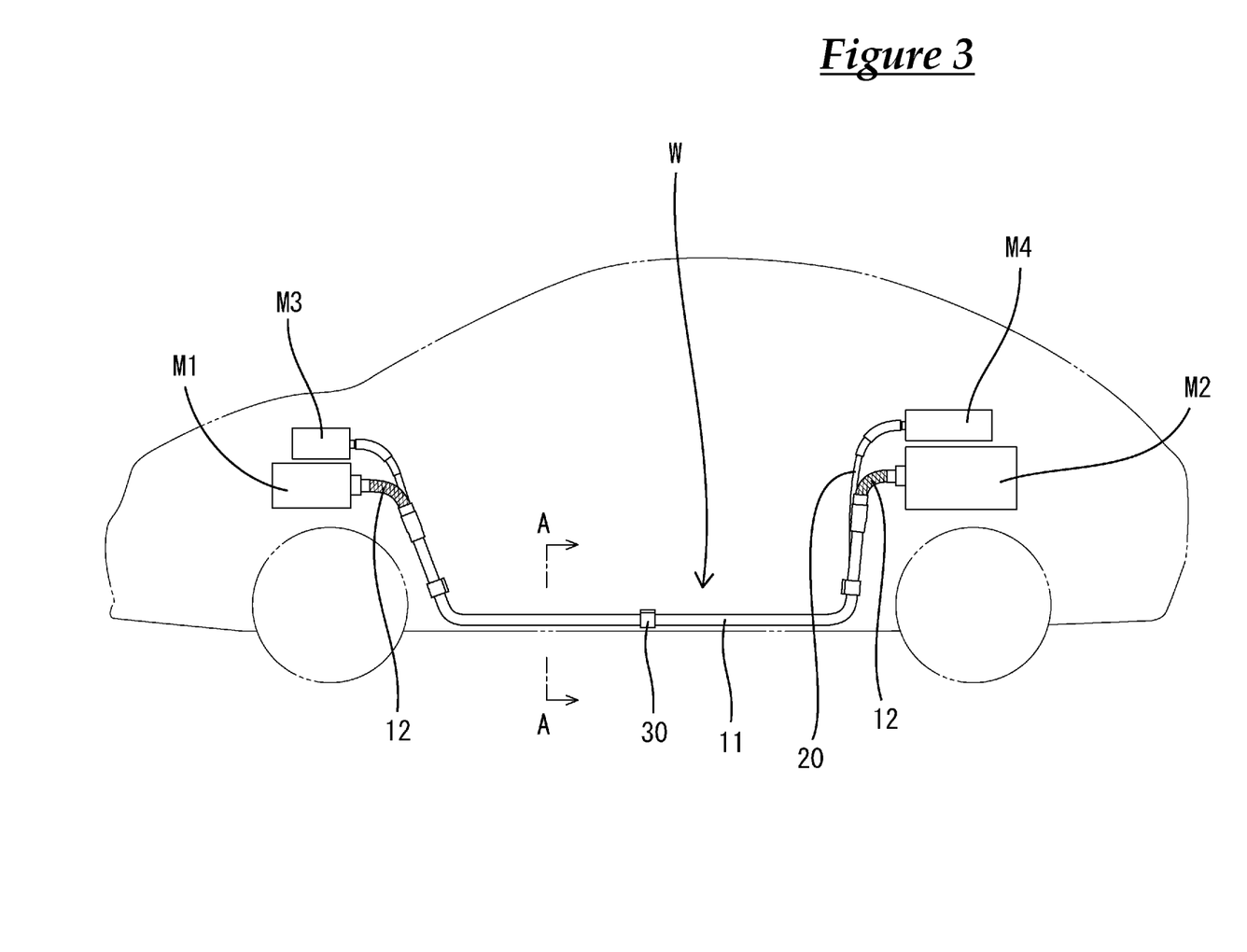
FIG. 3 is a schematic diagram schematically illustrating the wire harness secured to a vehicle body.

A flexible wire (hereinafter referred to as "flexible wire 24") is connected to the end portion of the low voltage wire 20. The flexible wire 24 is an ordinary wire without shielding capabilities obtained by encasing a flexible conductor (e.g., a stranded conductor produced by twisting multiple filaments) 25 in an insulation jacket 26. As shown in FIG. 2, in the low voltage wire 20 and flexible wire 24, the end portion of the shape-retaining conductor 21, which is not covered by the insulating member 22 at the end of the low voltage wire 20, and the end portion of the conductor 25, which is not covered by the insulation jacket 26 at the end of the flexible wire 24, are electrically connected by any suitable means such as ultrasonic welding, soldering, and the like. The connecting portion, in which the low voltage wire 20 and flexible wire 24 are joined, is covered by a protective member 27, such as a shrink tube and the like.

The flexible wire 24 is covered by a flexible sheath member 28, such as a corrugated tube and the like. The sheath member 28 is secured in place by securing means such as tape-wrapping (not shown). Terminal fittings T are connected to the end portions of the flexible wire 24. The wire harness W has clamps 30 that retain the pipe 11 and the low voltage wire 20 in place while being secured to a vehicle body. The clamps 30 are provided in multiple locations along the wire harness W. The pipe 11 and the low voltage wire 20 are coupled by the clamps 30.

The clamps 30, which are made of synthetic resin, are provided with a main body portion 31 capable of retaining the pipe 11 and the low voltage wire 20 in place (see FIG. 4). The main body portion 31 is provided with a high voltage line retaining portion 32 capable of retaining the pipe 11 in place and a low voltage line retaining portion 33 capable of retaining the low voltage wire 20 in place. The high voltage line retaining portion 32 fits over a portion of the pipe 11 in the length direction, and the low voltage line retaining portion 33 fits over a portion of the low voltage wire 20 in the length direction. The inner peripheral surfaces of the high voltage line retaining portion 32 and the low voltage line retaining portion 33 have an arcuate shape that respectively follows the outer peripheral surface of the pipe 11 and the outer peripheral surface of the low voltage wire 20.

Sections of the high voltage line retaining portion 32 and the low voltage line retaining portion 33 around the circumference thereof constitute aperture portions 34 that allow for the pipe 11 and the low voltage wire 20 to be fitted inside in a radial outside-to-inside direction. The aperture portions 34 are provided on the upper surface (upper surface when secured to a vehicle body) of the high voltage line retaining portion 32 and the low voltage line retaining portion 33, such that the pipe 11 and the low voltage wire 20 can be fitted therein from above. The aperture portions 34 have a tapered configuration, in which the width of the aperture gradually increases in the vertical direction. The dimensions of the aperture portions 34 are slightly smaller than the outside diameter dimensions of the pipe 11 in the high voltage line retaining portion 32 and slightly smaller than the outside diameter dimensions of the low voltage wire 20 in the low voltage line retaining portion 33. As a result, the pipe 11 and the low voltage wire 20 dilate the aperture portions 34 by causing the high voltage line retaining portion 32 or the low voltage line retaining portion 33 to undergo elastic deformation and are then fitted into the interior of the retaining portions 32, 33. Once the pipe 11 and the low voltage wire 20 are fitted inside, the high voltage line retaining portion 32 and the low voltage line retaining portion 33 elastically return to their original positions and grasp the pipe 11 and the low voltage wire 20 inside.

The high voltage line retaining portion 32 and the low voltage line retaining portion 33 are provided in a laterally spaced configuration (in the horizontal direction when secured to a vehicle body). The heightwise positions of the upper ends (aperture portions 34) of the high voltage line retaining portion 32 and the low voltage line retaining portion 33 are aligned, and the heightwise position of the lower end of the high voltage line retaining portion 32 is located below the heightwise position of the lower end of the low voltage line retaining portion 33.

A predetermined spacing is provided between the high voltage line retaining portion 32 and the low voltage line retaining portion 33. The main body portion 31 is provided with an exterior wall portion 36 that encloses a void space portion 35 extending from between the high voltage line retaining portion 32 and the low voltage line retaining portion 33 to below the low voltage line retaining portion 33. The exterior wall portion 36 is contiguous from the upper end of the low voltage line retaining portion 33 to the lower end of the high voltage line retaining portion 32.

The clamps 30 are provided with a cover portion 37 that covers the aperture portions 34 of the high voltage line retaining portion 32 and the low voltage line retaining portion 33. The cover portion 37 is shaped as a flat plate that can cover the aperture portions 34 of both the high voltage line retaining portion 32 and the low voltage line retaining portion 33. The cover portion 37 may be formed separately from the main body portion 31 or provided integrally therewith using hinges and the like.

The clamps 30 have locking means 38, whereby the cover portion 37 keeps the aperture portions 34 of the main body portion 31 closed. The locking means 38 are provided at both ends of the clamp 30 in the width direction (direction of alignment of the high voltage line retaining portion 32 and the low voltage line retaining portion 33) (see FIG. 6). The construction of the locking means 38 makes it possible to prevent separation in the vertical direction and offset in the horizontal direction between the cover portion 37 and the main body portion 31.

Figure 6:
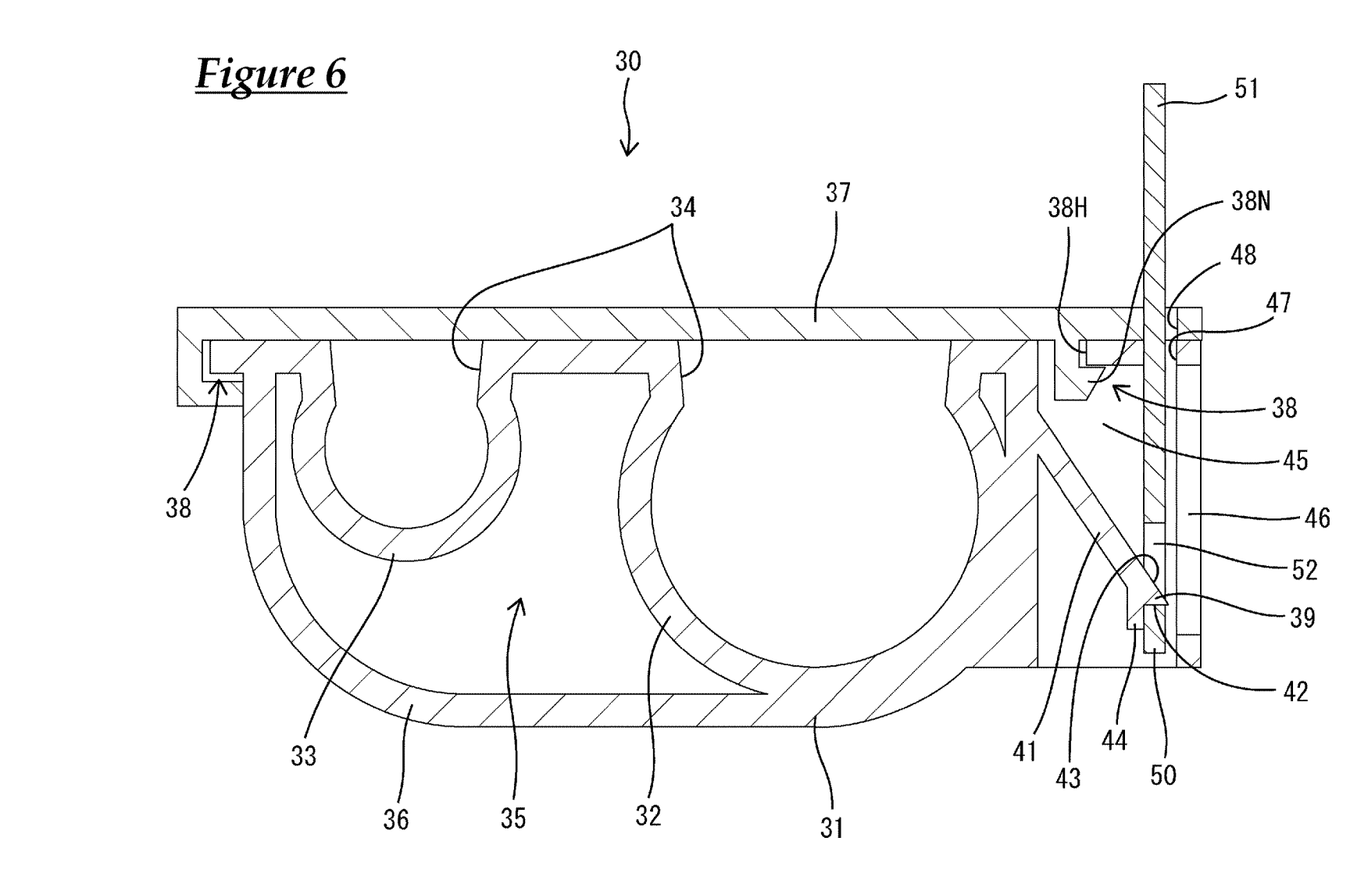
FIG. 6 is a cross-sectional view illustrating a clamp with an engagement pawl engaged with a fixed portion on a vehicle body.

As shown in FIG. 6, the clamps 30 are provided with an engagement pawl 39 engageable with a fixed portion 50 protruding from the vehicle body. The fixed portion 50 is part of a vehicle bracket 51 secured at an arbitrary location on the vehicle body. The fixed portion 50 protrudes downwardly in the shape of a plate, and an engagement aperture 52, which the engagement pawl 39 can enter, is provided in the lower end portion of the fixed portion 50. The engagement aperture 52 is rectangular in shape and goes through the fixed portion 50 in the horizontal direction.

The engagement pawl 39 is provided at the distal end of an engagement piece 41 provided in the clamp 30. The engagement piece 41 is provided at one of the main body portion 31 in the width direction (direction of alignment of the high voltage line retaining portion 32 and the low voltage line retaining portion 33). The engagement piece 41, which is provided adjacent the high voltage line retaining portion 32, extends diagonally downwards in a cantilever configuration from the vicinity of the upper end to the vicinity of the lower end of the high voltage line retaining portion 32.

The engagement pawl 39 protrudes outwardly (away from the high voltage line retaining portion 32) from the distal end portion of the engagement piece 41. The bottom face of the engagement pawl 39 constitutes an engagement face 42 engageable with the bottom face of the engagement aperture 52. The engagement face 42 is a substantially horizontal face when the clamp 30 is secured to a vehicle body. Downward displacement of the engagement piece 41 is restricted by the engagement of the engagement face 42 with the bottom face of the engagement aperture 52.

The upper face of the engagement pawl 39 constitutes a guide face 43 that is inclined so as to cause the engagement piece 41 to undergo resilient displacement inwardly (towards the high voltage line retaining portion 32) as a result of abutting the fixed portion 50 when the clamp 30 is secured to the fixed portion 50. The inclination of the guide face 43 has the same gradient as the inclination of the engagement piece 41.

A stopper portion 44, which prevents the engagement pawl 39 from being withdrawn outwardly from the engagement aperture 52 of the fixed portion 50, is provided in the lower end portion of the engagement piece 41. The stopper portion 44 protrudes vertically downwards from the proximal end of the engagement pawl 39. The stopper portion 44 restricts outward displacement of the engagement piece 41 by abutting a major surface of the fixed portion 50 from the inside.

Due to the fact that vertical displacement of the engagement piece 41 is restricted by the engagement pawl 39 and width-direction displacement of the engagement piece 41 is restricted by the stopper portion 44, the clamp 30 is retained in place while being secured to and suspended from the fixed portion 50.

The clamp 30 has a containing wall portion 45 that surrounds the engagement piece 41 and fixed portion 50 on the four sides and from the top and can contain the engagement piece 41 and fixed portion 50 inside. The containing wall portion 45 is provided in the main body portion 31.

Figure 5:
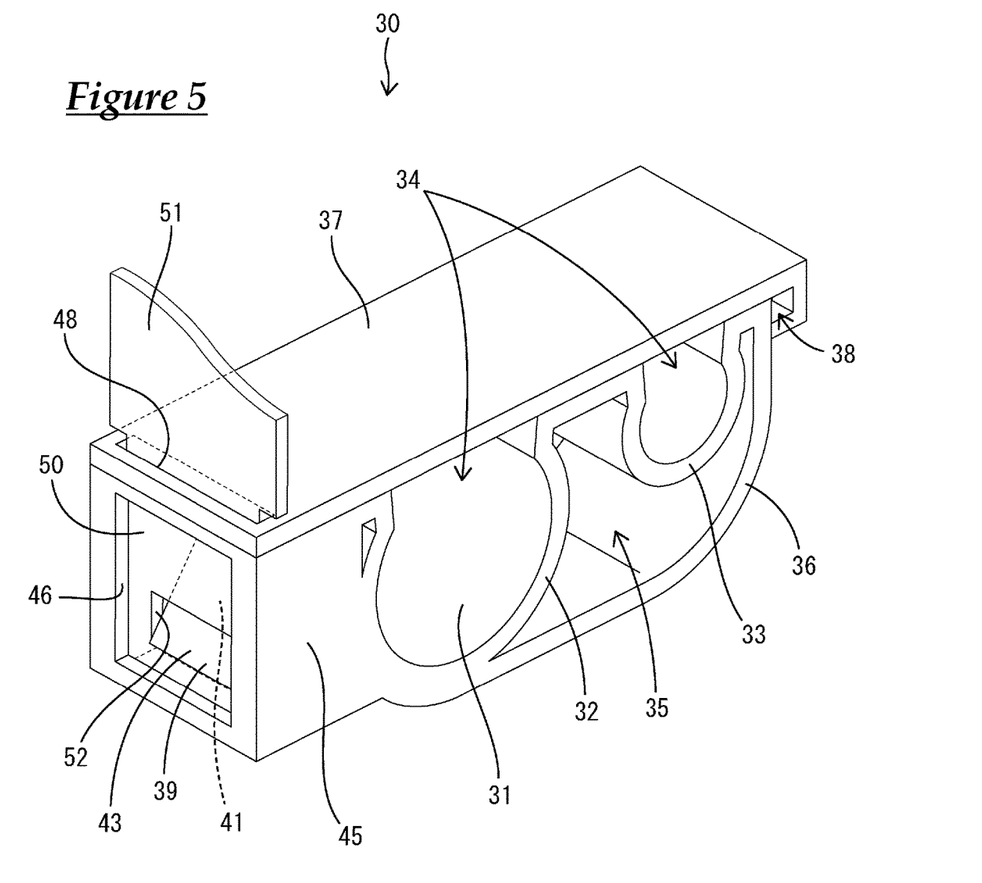
FIG. 5 is a perspective view illustrating a clamp with an engagement pawl engaged with a fixed portion on a vehicle body.
Figure 7:
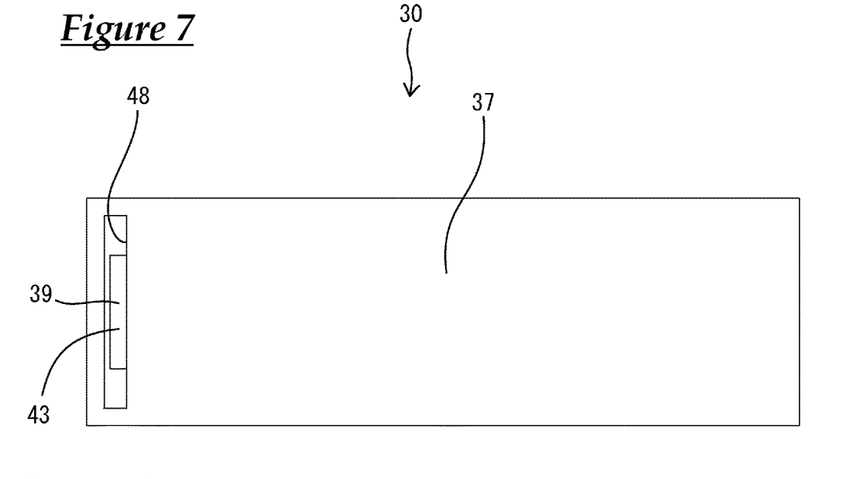
FIG. 7 is a plan view illustrating the clamp.
Figure 8:
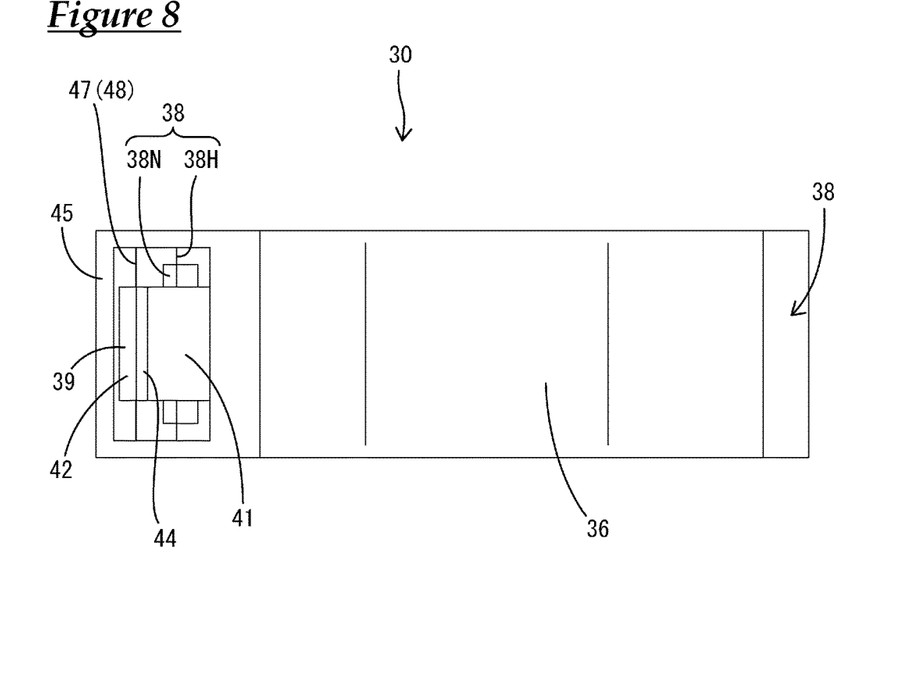
FIG. 8 is a bottom view illustrating the clamp.

A window portion 46, whose configuration matches the engagement piece 41, is provided at a location within the containing wall portion 45 that faces the high voltage line retaining portion 32. An insertion aperture 47, which permits insertion of the fixed portion 50 into the containing wall portion 45, is formed in the vertical direction through the upper part of the containing wall portion 45. The insertion aperture 47 is shaped as a narrow elongated slit made in the fore-and-aft direction that matches the shape of the fixed portion 50.

In addition, a locking aperture 38H, which forms part of the locking means 38, is provided vertically through the upper part of the containing wall portion 45. A locking pawl 38N, which engages with the locking aperture 38H, is provided on the cover portion 37 and, when engaged with the locking aperture 38H, is contained within the containing wall portion 45. It should be noted that the interior space of the containing wall portion 45 is open at the bottom.

A cross-over aperture 48, which is located contiguously above the insertion aperture 47 and permits insertion of the fixed portion 50, is provided in the cover portion 37. The cross-over aperture 48, which is identical in shape to the insertion aperture 47, passes through the cover portion 37 in the vertical direction.

An example of manufacturing the wire harness W of the present embodiment will be described next.

First of all, a high-voltage electric path is fabricated. Two high voltage wires 10 are inserted into a pipe 11 and the pipe 11 is bent into a predetermined shape. Shielding members 12 are secured over the sections of the high voltage wires 10 that are brought out of the pipe 11, and the end portions of the shielding members 12 are firmly attached to end portions of the pipe 11. Terminal fittings withdrawn from the shielding members 12 are received within connectors C and the terminal portions of the shielding members 12 are firmly attached to the connectors C.

Subsequently, a low-voltage electric path is fabricated. An operation is performed, during which a shape-retaining conductor 21 is passed through a hollow portion 23 of a separately manufactured insulating member 22. This operation can be performed inexpensively because there is no need for an electric wire factory, unlike cases involving ordinary electric wires, in which an insulation jacket is made by extrusion molding while paying out a conductor. After that, the shape-retaining conductor 21 covered by the insulating member 22 is bent into a predetermined shape. A flexible wire 24 is connected to the end portion of a low voltage wire 20 and a protective member 27 is fitted over the flexible wire 24. It should be noted that the bending of the low voltage wire 20 may be performed after connecting the flexible wire 24 to the end portion.

Next, clamps 30 are attached to the pipe 11 and the low voltage wire 20. The cover portions 37 of the clamps 30 are removed, and the pipe 11 and low voltage wire 20 are respectively fitted into the high voltage line retaining portion 32 and the low voltage line retaining portion 33. When the cover portion 37 is attached to the main body portion 31 and the locking means 38 is locked, the clamps 30 become attached to the pipe 11 and low voltage wire 20. Attaching the clamps 30 secures the pipe 11 and the low voltage wire 20 in a side-by-side configuration. This completes the operation of manufacturing of the wire harness W.

An example of securing the wire harness W of the present embodiment to a vehicle body will be described next. The positions of the cross-over aperture 48 and insertion aperture 47 of the clamps 30 are made to coincide with the fixed portions 50 of the vehicle bracket 51 secured to the vehicle body, and the clamps are pushed in. At such time, the fixed portion 50 is inserted into the cross-over aperture 48 and insertion aperture 47, the engagement pawl 39 is subjected to pressure from the fixed portion 50, and the engagement piece 41 undergoes inward resilient displacement. Eventually, when the engagement pawl 39 enters the engagement aperture 52 of the fixed portion 50, the engagement piece 41 elastically returns in an outward direction, and the stopper portion 44 abuts the inside of the fixed portion 50. This secures the clamp 30 in a state in which it is suspended from the fixed portion 50. The clamp 30 secured to the fixed portion 50 holds the pipe 11 and the low voltage wire 20 substantially horizontally (parallel to the ground surface). The wire harness W is secured to the vehicle body as a result of securing multiple clamps 30 to the vehicle body.

When secured to the vehicle body, the wire harness W is routed under the floor of the vehicle generally in the fore- and-aft direction of the vehicle, with both end portions thereof upwardly bent and introduced into the interior of the vehicle. As shown in FIG. 4, the section of the wire harness W disposed under the floor of the vehicle is such that the lower end of the pipe 11 is located in a position that is relatively lower than the lower end of the low voltage wire 20. In other words, the lower end of the low voltage wire 20 is positioned above the lower end of the pipe 11 by approximately half of the outside diameter dimensions of the pipe 11. In addition, the pipe 11 is disposed on the side of the wire harness W that is closer to heat sources, at a location near heat sources (not shown) such as the exhaust pipe, and the like, and the low voltage wire 20 is disposed on the side opposite to the heat sources, with the pipe 11 in between. If this configuration is used, the low voltage wire 20 is shielded from the heat of the heat sources by the pipe 11 and, therefore, can be protected from the heat of the heat sources.

The action and effects of the embodiment configured in the above-described manner will be described next.

The wire harness W used in the present embodiment is provided with high voltage wires 10, which are passed through a pipe 11 that possesses shielding properties and shape retention properties, and a low voltage wire 20, in which a shape-retaining conductor 21 that possesses electrically conductive properties and shape retention properties is encased by an insulating member 22. If this configuration is used, the low voltage wire 20 is placed on the outside of the pipe 11 and, as a result, the low voltage wire 20 is not affected by the electromagnetic noise of the high voltage wires 10 and, therefore, the high-voltage wires 10 and the low voltage wire 20 can be combined without using shielded wires.

In the past, when a shielded wire was used and passed through the pipe together with the high-voltage wires, the shielded wire had to be brought through a gap in a braided member connected to the end portion of the pipe to branch away from the high-voltage wires. In such a case, an operation to widen the mesh openings of the braided member had to be performed, which involved the risk of electromagnetic noise leaks through widened mesh openings resulting from widening the mesh openings of the braided member. By contrast, the wire harness W of the present embodiment does not have to use shielded wires and, therefore, the operation involving widening the mesh openings of the braided member to pull out the wire can be omitted, and leaks of electromagnetic noise through widened mesh openings can be prevented. Furthermore, since only the high-voltage wires 10 need to be passed through the pipe 11, the diameter dimensions of the pipe 11 can be minimized, thereby making it possible to implement a lower profile for the wire harness W. In addition, since the low voltage wire 20 itself possesses shape-retaining capabilities, the sagging of the low voltage wire 20 can be prevented and it is possible to avoid interference between the low voltage wire 20 and the road surface.

Furthermore, the section routed under the floor of the vehicle when the harness is secured to the body of the vehicle is such that the lower end of the pipe 11 is located in a position that is relatively lower than the lower end of the low voltage wire 20. If this configuration is used, the pipe 11 hits the ground first, and the low voltage wire 20 can be prevented from hitting the ground, thereby making it possible to protect the low voltage wire 20.

In addition, the wire harness W has clamps 30 that hold the pipe 11 and the low voltage wire 20 in place while being secured to the vehicle body, and these clamps 30 are provided with engagement pawls 39 engageable with fixed portions 50 protruding from the vehicle body. If this configuration is used, the clamps 30 can be secured to the vehicle body without using fastening members such as, for example, bolts and nuts.

The present invention is not limited to the embodiment described in the discussion above with reference to the drawings, and, for example, the following embodiments are also within the technical scope of the present invention.

In the above-described embodiment, the pipe 11 was a metal pipe. However, the invention is not limited to this, and the metal pipe may of any type as long as it possesses shielding properties and shape retention properties, for example, it may be constructed by concentrically embedding metal foil inside a resin pipe, etc.

In the above-described embodiment, the wire harness W was provided with a single low voltage wire 20. However, the invention is not limited to this, and two or more low voltage wires may be provided.

In the above-described embodiment, the shape-retaining conductor 21 was inserted into the hollow portion 23 of a separately manufactured insulating member 22. However, the invention is not limited to this, and, in the same manner as with ordinary wires, a shape-retaining conductor that is continuously paid out may be covered by an insulating member using extrusion molding.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

W Wire harness
10 High-voltage wire
11 Pipe
20 Low voltage wire
21 Shape-retaining conductor
22 Insulating member
30 Clamp
39 Engagement pawl
50 Fixed portion

What is claimed is:

1. A wire harness, comprising: a high voltage wire that is passed through a pipe having shielding properties and shape retention properties, and a low voltage wire in which a shape-retaining conductor that runs parallel to the pipe and has electrically conductive properties and shape retention properties is encased by an insulating member.

2. The wire harness according to claim 1, wherein, in a section routed under the floor of a vehicle upon securing to the body of a vehicle, the lower end of the pipe is located in a position that is relatively lower than the lower end of the low voltage wire.

3. The wire harness according to claim 1, further comprising: a clamp that holds the pipe and the low voltage wire in place while being secured to a vehicle body, and the clamp is provided with an engagement pawl engageable with a fixed portion protruding from the vehicle body.

* * * * *